United States Patent [19]

Hayashi

[11] Patent Number: 5,383,065
[45] Date of Patent: Jan. 17, 1995

[54] MAGNETIC DISK RECORDER
[75] Inventor: Nobuhiro Hayashi, Tokyo, Japan
[73] Assignee: Sony Corporation, Tokyo, Japan
[21] Appl. No.: 896,832
[22] Filed: Jun. 11, 1992
[30] Foreign Application Priority Data
　Jun. 24, 1991 [JP]　Japan ................... 3-151909
[51] Int. Cl.⁶ .............................................. G11B 5/02
[52] U.S. Cl. .................................................. 360/67
[58] Field of Search .................. 360/46, 48, 61, 67, 360/68, 77.01, 77.02, 77.04, 77.06, 78.14, 53, 77.08

[56] References Cited

U.S. PATENT DOCUMENTS

| | | | |
|---|---|---|---|
| 4,016,603 | 4/1977 | Ottesen | 360/135 |
| 4,797,754 | 1/1989 | Sugano et al. | 360/48 |
| 4,916,562 | 4/1990 | Miwa et al. | 360/77.06 X |
| 4,964,009 | 10/1990 | Moriya et al. | 360/77.08 X |
| 5,073,834 | 12/1991 | Best et al. | 360/77.08 |
| 5,121,262 | 6/1992 | Squires et al. | 360/53 X |
| 5,148,329 | 9/1992 | Yamauchi et al. | 360/19.1 X |
| 5,162,395 | 12/1992 | Klaassen et al. | 360/46 X |
| 5,196,970 | 3/1993 | Seko et al. | 360/77.03 |
| 5,268,798 | 12/1993 | Shinn | 360/48 |
| 5,268,803 | 12/1993 | Sugita et al. | 360/77.08 |
| 5,270,877 | 12/1993 | Fukushima et al. | 360/49 X |

FOREIGN PATENT DOCUMENTS 9101554　2/1991　WIPO ................. 360/48

Primary Examiner—Donald Hajec
Assistant Examiner—Le Thien Minh
Attorney, Agent, or Firm—Limbach & Limbach

[57] ABSTRACT

A magnetic disk includes a servo zone for reproducing signals for control therefrom and a data zone for recording and reproducing a data signal, wherein the servo zone and the data zone are alternately and repeatedly provided on each of annular tracks, and at least a header portion of each of the servo zones is constituted by a recognizable data. A magnetic disk recorder for recording a signal on and reproducing a signal from the thus constructed magnetic disk includes a recording amplifier for supplying a signal to a magnetic head to thereby record the signal on the magnetic disk, and a unit for, upon turning off an operation of the recording amplifier, applying to the recording amplifier a current for generating a magnetic field from the magnetic head directed to the same direction as a magnetized direction of a predetermined bit of a header portion of the servo zone.

2 Claims, 4 Drawing Sheets

F I G. 2
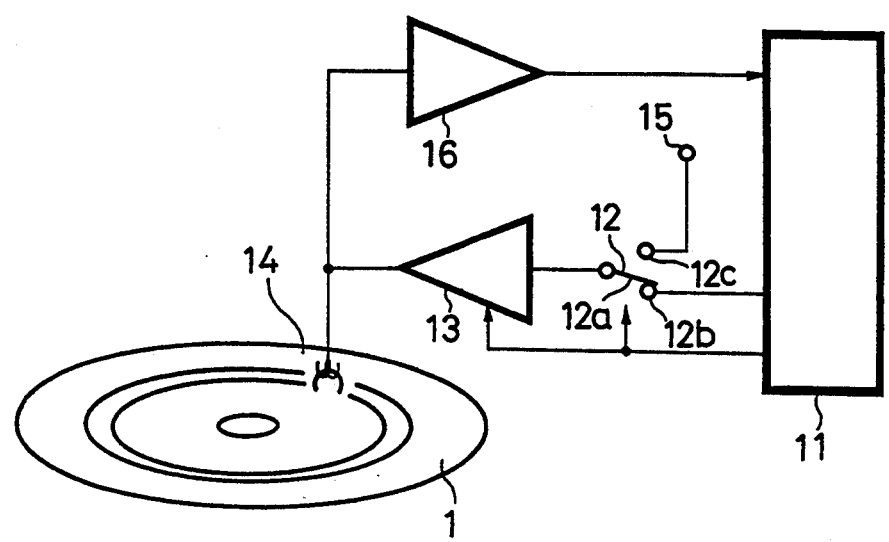
F I G. 3
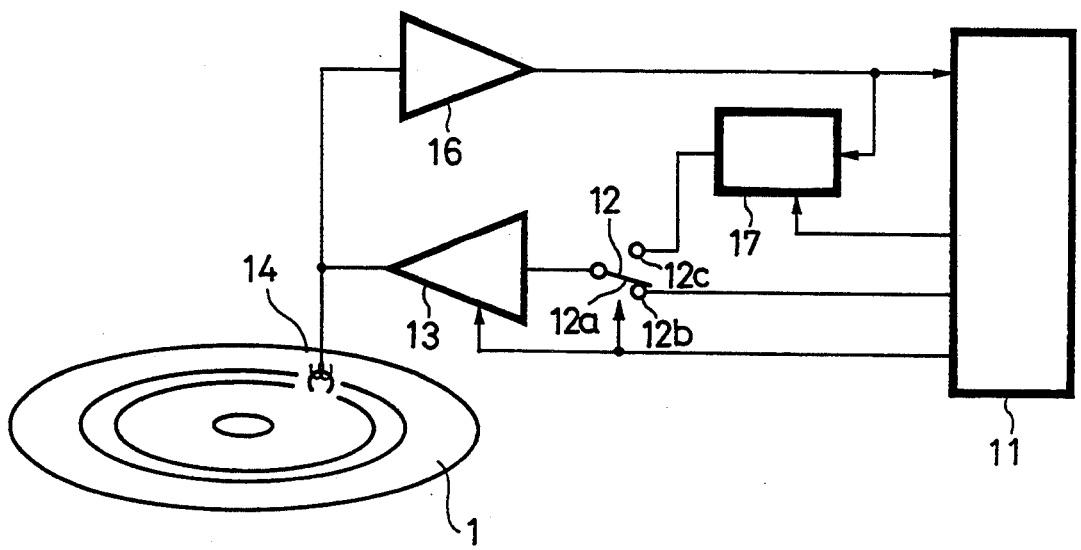

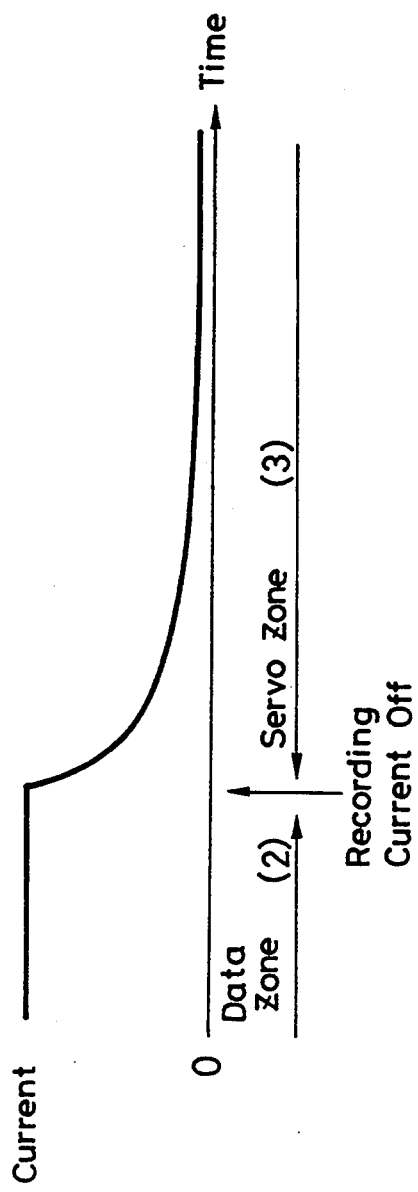
F I G. 4A
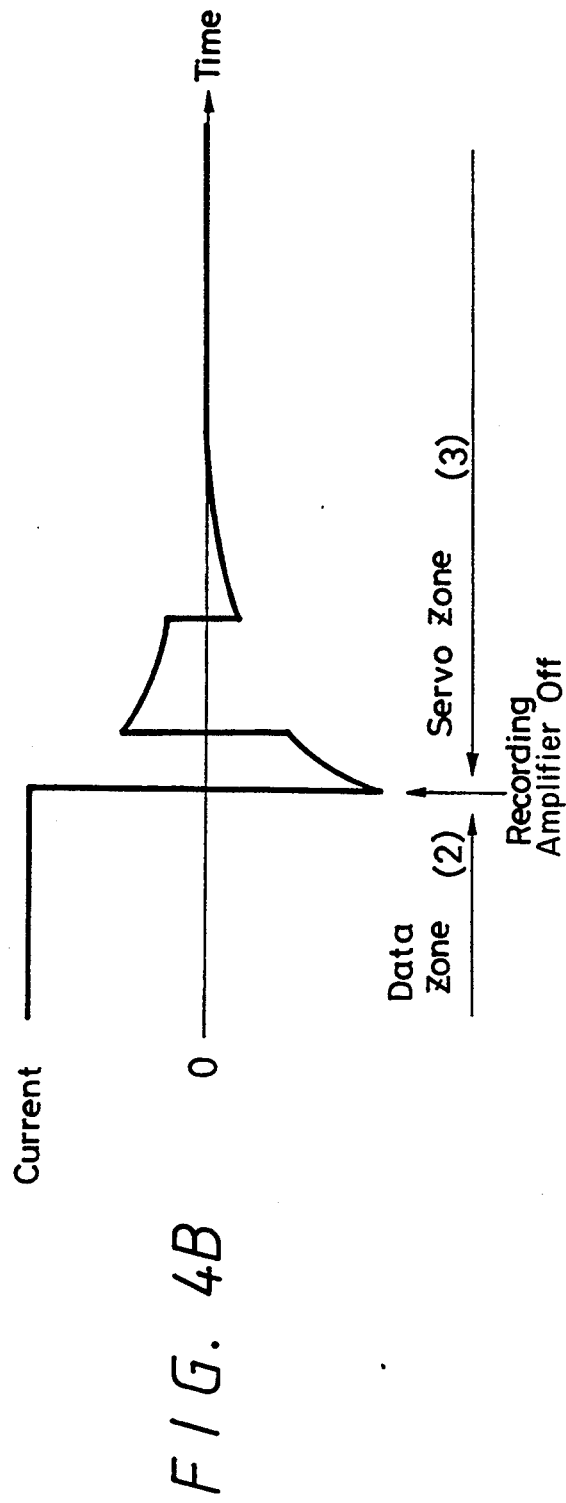
F I G. 4B

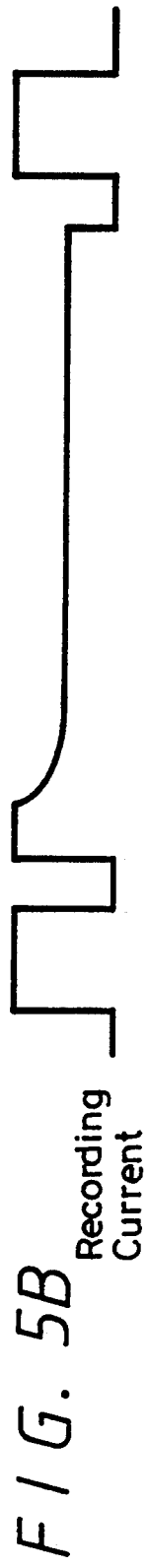
FIG. 5A Format
FIG. 5B Recording Current

MAGNETIC DISK RECORDER

BACKGROUND OF THE INVENTION

1. Field of the Invention

The present invention generally relates to magnetic disks and magnetic disk recorders using the same and, more particularly, is directed to a magnetic disk and a magnetic disk recorder using the same to which the sampled servo tracking method, for example, can be applied.

2. Description of the Related Art

In the magnetic recording techniques, a so-called sampled servo tracking method has been known as one of the tracking servo methods. In a disk to which the sampled servo tracking method is applied, a servo zone and a data zone are alternately and repeatedly provided on each of plurality of annular tracks on the disk. Signals for control are reproduced from the servo zone, and a data signal is recorded on and reproduced from the data zone in accordance with a clock signal or the like reproduced from the servo zone. Thus, in the thus arranged sampled servo tracking method, a space or distance along a track between the adjacent servo and data zones is required to be very small.

Further, according to the sampled servo tracking method, since the signals recorded in the servo zone must not be erased at all, the sampled servo tracking method has been employed to magneto-optical disks. This is because, in the magneto-optical disk, the signals in the servo zone can be recorded by pregrooves so as not to be erased.

However, when the sampled servo tracking method is employed in a magnetic disk recorder, the following problem arises. For example, when an operation is changed to the reproduction of the servo zone from the recording of the data zone, a recording output current of a recording amplifier does not drop to zero immediately but gradually decreases to zero due to a transient residual output current of the amplifier. Thus, data at a header portion of the servo zone following a just recorded data zone is overwritten and may be erased by the transient residual output current from the recording amplifier.

In order to eliminate this problem in the magnetic disk recorder, a space, corresponding to a period between a timing of the change from the recording of the data zone to the reproduction of the servo zone and a timing when the recording output current of the recording amplifier drops to zero, must be provided between the last portion of the data zone and the header portion of the servo zone. Thus, it becomes difficult to correctly maintain the relation between the data zone and the servo zone owing to the space. Accordingly, it has been impossible to employ the sampled servo tracking method in the magnetic disk recorder.

OBJECTS AND SUMMARY OF THE INVENTION

Accordingly, it is an object of the present invention to provide an improved magnetic disk and an improved magnetic disk recorder in which the aforementioned shortcomings and disadvantages encountered with the related art can be eliminated.

More specifically, it is an object of the present invention to provide a magnetic disk and a magnetic disk recorder which can employ the sampled servo tracking method without providing a space between the data zone and the servo zone.

As an aspect of the present invention, a magnetic disk is comprised of a servo zone for reproducing signals for control therefrom and a data zone for recording and reproducing a data signal, wherein the servo zone and the data zone are alternately and repeatedly provided on each of annular tracks, and at least a header portion of each of the servo zones is constituted by a recognizable data.

As another aspect of the present invention, a magnetic disk recorder for recording a signal on and reproducing a signal from the thus constructed magnetic disk is comprised of a recording amplifier for supplying a signal to a magnetic head to thereby record the signal on the magnetic disk, and a unit for, upon turning off an operation of the recording amplifier, applying to the recording amplifier a current for generating a magnetic field from the magnetic head directed to the same direction as a magnetized direction of a predetermined bit of a header portion of the servo zone.

According to the thus constituted magnetic disk and the magnetic disk recorder, the space between the data zone and the servo zone of the magnetic disk can be eliminated, so that the sampled servo method can be applied to the magnetic disk and the magnetic disk recorder with good performance.

The preceding and other objects, features, and advantages of the present invention will become apparent from the following detailed description of illustrative embodiments thereof when read in conjunction with the accompanying drawings.

BRIEF DESCRIPTION OF THE DRAWINGS

FIG. 2 is a block diagram showing an arrangement of a magnetic disk recorder according to a first embodiment of the present invention;

FIG. 3 shows a block diagram illustrating an arrangement of the magnetic disk recorder according to a second embodiment of the present invention;

FIGS. 4A and 4B are respectively waveform diagrams used to explain operation of the second embodiment; and FIGS. 5A and 5B are respectively schematic diagrams illustrating a relation between the format of the magnetic disk and a recording current.

DETAILED DESCRIPTION OF THE PREFERRED EMBODIMENTS

A magnetic disk and a disk recorder according to the first embodiment will now be described with reference to FIGS. 1A, 1B and 2.

Figure 1A:
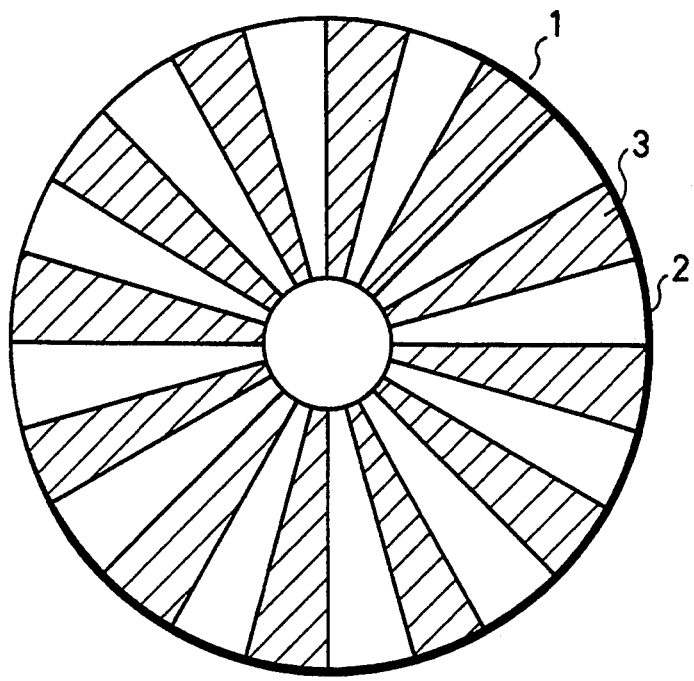
FIG. 1A shows a schematic top view of a magnetic disk illustrating a format thereof.
Figure 1B:
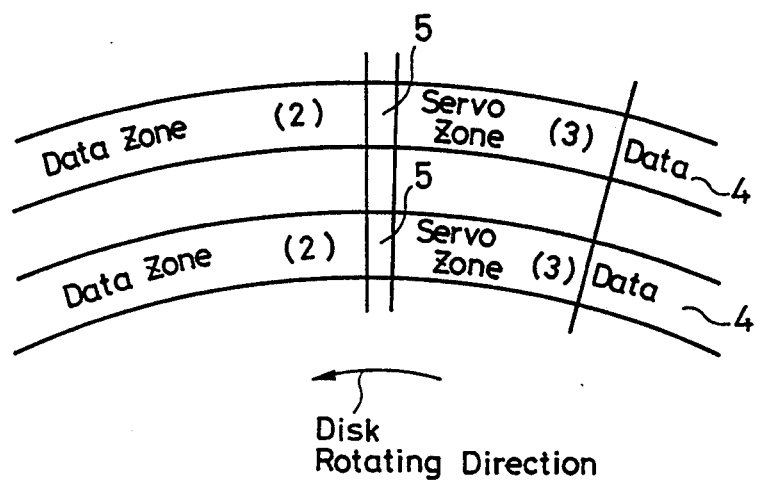
FIG. 1B shows an enlarged top view of the essential part of the disk shown in FIG. 1A.

FIG. 1A shows a schematic top view of a magnetic disk 1 of the present invention illustrating a recording format thereof. As is clear from FIG. 1A, a data zone 2 and a servo zone 3 are alternately and repeatedly provided on each of annular tracks of the magnetic disk 1. FIG. 1B shows an enlarged top view of the essential part of the magnetic disk 1 shown in FIG. 1A. Referring to FIG. 1B, the data zone 2 and the servo zone 3 are alternately and repeatedly provided on the same track 4, and at least a header portion of each of the servo zones 3 is constituted by a recognizable data 5 in advance.

When the period during which the transient recording output current of a recording amplifier drops to zero corresponds to not more than 1 bit of informations recorded on the servo zone 3, the first bit of each of the servo zones 3 is always magnetized in the same direction. Thus, at the same time of turning off the operation of the recording amplifier, if a current for generating a magnetic field in the same direction as the magnetized direction of the first one bit is delivered, the first bit of each of the servo zones 3 is prevented from being damaged.

FIG. 2 is a block diagram illustrating an arrangement of the magnetic disk recorder according to the first embodiment. Referring to FIG. 2, a recording data signal is applied from a controlling and data processing unit 11 to a recording amplifier 13 through one fixed contact 12b of a change-over switch 12 and its movable contact 12a. An output signal of the recording amplifier 13 is applied to a magnetic head 14 to thereby record the data on the magnetic disk 1. A predetermined signal is also applied to the other fixed contact 12c of the change-over switch 12 from a terminal 15. The predetermined signal, when applied to the input of recording amplifier 13 just as it is being turned off, causes the recording amplifier 13 to output a current to the recording head 14 which generates a magnetic field polarized in the same direction as the polarity of the first bit of each servo zone 3. A control signal is applied from the controlling and data processing unit 11 to the recording amplifier 13 and the change-over switch 12 so that the operation of the recording amplifier 13 is turned off and simultaneously the movable contact 12a of the switch 12 is changed from the one fixed contact 12b to the other fixed contact 12c at the end portion of the data zone 2 in response to the control signal. A reproduced data from the magnetic head 14 is applied to the controlling and data processing unit 11 through a reproducing amplifier 16.

According to the thus constituted magnetic disk recorder, the predetermined signal is applied to the recording amplifier 13 from the terminal 15 so that a transient residual output current is delivered from the recording amplifier 13 to the magnetic head 14 as the recording amplifier 13 is turned off. Thus, since the recording amplifier 13 delivers on the basis of the predetermined signal a current for generating a magnetic field directed to the same direction as the magnetized direction of the first bit of each of the servo zones 3, the first bit of each of the servo zones 3 is prevented from being damaged.

FIG. 3 is a block diagram showing an arrangement of the magnetic disk recorder according to the second embodiment, which can prevent the recorded data at the header portion of the servo zone 3 from being damaged when the period between the time point of the turning off of the operation of the recording amplifier 13 and the time point where the recording output current of the recording amplifier 13 becomes zero corresponds to plural bits of the information recorded in the servo zone 3. In FIG. 3, portions identical to those of FIG. 2 are referred to by the common symbols, with explanation thereof being omitted.

Referring to FIG. 3, the reproduced signal from the reproducing amplifier 16 is supplied to a random access memory (RAM) 17, which in turn supplies a signal to the other fixed contact 12c of the change-over switch 12. A control signal is supplied from the controlling and data processing unit 11 to the RAM 17 so that the signal of the header portion of the servo zone 3 is stored in the RAM 17. In response to another control signal from the controlling and data processing unit 11, the stored signal of the RAM 17 is read out therefrom upon the turning off of the operation of the recording amplifier 13 and then applied to the recording amplifier 13.

According to the thus constituted magnetic disk recorder of the second embodiment, the stored signal of the header portion of the servo zone 3 is applied to the recording amplifier 13 from the RAM 17 to produce a corresponding transient residual output current which is delivered from the recording amplifier 13 upon the turning off of the recording amplifier 13. Thus, the recorded data at the header portion of the servo zone 3 is prevented from being damaged.

If the last two bits of the recording current of the data zone 2 are positive, the transient residual output current shown in FIG. 4A is delivered from the recording amplifier 13 when the operation thereof is turned off. In this case, the above-described stored signal is supplied to the recording amplifier 13 from the RAM 17, so that the output current of the recording amplifier 13 is changed to the waveform of FIG. 4B. Thus, even if data at the header portion of the servo zone 3 is overwritten by the transient residual output current from the recording amplifier 13, the recorded data of the header portion is kept in the original magnetized states.

In the above-described sampled servo tracking method, information can be recorded at the correct phase since the clock signal is always obtained. Further, since the thus constituted magnetic disk recorder necessarily reproduces the data in the servo zone 3 in advance in order to confirm the track or the like in case of recording data, during this period the recorded signal of the header portion of the servo zone 3 can be stored in the RAM 17.

Thus, according to the thus constituted magnetic disk and the magnetic disk recorder, the space between the data zone 2 and the servo zone 3 can be eliminated, so that the sampled servo tracking method can be applied to the magnetic disk and the magnetic disk recorder with good performance.

In the above described magnetic disk recorder, the data of the header portion of the servo zone 3 can not be reproduced while the transient residual output current is delivered from the recording amplifier 13 after the turning off of the operation of the recording amplifier 13. Now, the information recorded in the servo zone 3 includes (1) seek information for the seek operation of the magnetic head 14, (2) clock information for reproducing the clock signal, and (3) tracking information for correctly tracing the same track. The informations (2) and (3) are necessary for the recording operation of data, but the information (1) is not necessary for the recording operation.

In view of this, the recording format of the servo zone 3 is arranged in the order of the seek information, clock information and tracking information from the header portion as shown in FIG. 5A, for example. According to this format, since the seek information is address information of about 5 to 10 bits, for example, the transient residual output current from the recording amplifier 13 can be sufficiently decreased to zero during the reproduction of the seek information. Thus, the clock information and the tracking information subsequent to the seek information can be reproduced correctly. In this regard, during the seek operation, since the recording amplifier 13 is in the off state and the magnetic disk recorder is always in a reproduction mode, there is no problem.

As set out above, according to the present invention, since the space between the data zone and the servo zone can be eliminated, the sampled servo tracking method can be applied to the magnetic disk and the magnetic disk recorder with good performance.

Having described the preferred embodiments of the invention with reference to the accompanying drawings, it is to be understood that the invention is not limited to those precise embodiments and that various changes and modifications thereof could be effected by one skilled in the art without departing from the spirit or scope of the invention as defined in the appended claims.

What is claimed is:

1. A magnetic disk recorder for recording a signal on and reproducing a signal from a magnetic disk which includes a servo zone for reproducing signals for control therefrom, the servo zone including at least header portion constituted by recognizable information including a predetermined bit having a given magnetized direction, and a data zone for recording and reproducing a data signal, wherein the servo zone and the data zone are alternately and repeatedly provided on each of annular tracks, comprising:

a recording amplifier for supplying a signal to the magnetic head to thereby record the signal on the magnetic disk; and means for turning off said recording amplifier while simultaneously applying to said recording amplifier a predetermined signal to cause the recording amplifier to supply a signal to the magnetic head to generate a magnetic field from the magnetic head directed to the same direction as the magnetized direction of the predetermined bit of the header portion of the servo zone.

2. A magnetic disk recorder according to claim 1, wherein said means for turning off the recording amplifier while applying the predetermined signal includes a memory for storing and applying a signal of the header portion of the servo zone reproduced by the magnetic head.

* * * * *